(12) United States Patent
Fujita et al.

(10) Patent No.: US 11,949,449 B2
(45) Date of Patent: Apr. 2, 2024

(54) SPATIAL OPTICAL TRANSMISSION APPARATUS

(71) Applicant: TOYO ELECTRIC CORPORATION, Kasugai (JP)

(72) Inventors: Hideo Fujita, Kasugai (JP); Abdelmoula Bekkali, Kasugai (JP); Michikazu Hattori, Kasugai (JP)

(73) Assignee: Toyo Electric Corporation, Kasugai (JP)

( * ) Notice: Subject to any disclaimer, the term of this patent is extended or adjusted under 35 U.S.C. 154(b) by 0 days.

(21) Appl. No.: 17/753,357

(22) PCT Filed: Mar. 2, 2021

(86) PCT No.: PCT/JP2021/007875
§ 371 (c)(1),
(2) Date: Aug. 2, 2022

(87) PCT Pub. No.: WO2021/256013
PCT Pub. Date: Dec. 23, 2021

(65) Prior Publication Data
US 2022/0368416 A1    Nov. 17, 2022

(30) Foreign Application Priority Data

Jun. 19, 2020    (JP) .................................. 2020-106236

(51) Int. Cl.
*H04B 10/11*    (2013.01)
(52) U.S. Cl.
CPC ................................. *H04B 10/11* (2013.01)

(58) Field of Classification Search
CPC .... H04B 10/11; H04B 10/1143; H04B 10/50; H04B 10/40; H04B 10/564; H04B 10/07;
(Continued)

(56) References Cited

U.S. PATENT DOCUMENTS

| | | | |
|---|---|---|---|
| 2017/0054499 A1 | 2/2017 | Graves et al. | |
| 2019/0137355 A1* | 5/2019 | Nakatani | ............ G01M 11/3136 |

FOREIGN PATENT DOCUMENTS

| | | | | |
|---|---|---|---|---|
| JP | 2006094135 A | * | 4/2006 | ............. H04B 10/00 |
| JP | 2006094135 A | | 4/2006 | |

(Continued)

OTHER PUBLICATIONS

JP-2006094135A Machine translation (Year: 2006).*
(Continued)

*Primary Examiner* — Hibret A Woldekidan
(74) *Attorney, Agent, or Firm* — Dorsey & Whitney LLP

(57) ABSTRACT

Optical transmission apparatuses are disclosed. An example apparatus includes: a circulator that receives and provides a first signal at a first port and at a second port respectively, and receives and provides a second signal at the second port and at a third port respectively; a projecting lens movable perpendicular to an optical axis of a signal through the second port; a receiving lens movable perpendicular to an optical axis of a signal through the third port; a spectroscope that splits a signal through the receiving lens into transmitted light and reflected light; a sensor that detects an optical axis position of either the transmitted light or reflected light; and a controller that adjusts a position of the receiving lens and/or the projecting lens based on the optical axis position, and adjusts the optical axis to cause the other of the transmitted light or reflected light to enter a cable.

6 Claims, 6 Drawing Sheets

(58) Field of Classification Search
CPC ............. H04B 10/071; H04B 10/0795; H04B 10/07955; H04B 10/0799; H04B 10/07953; H04B 10/43; H04B 10/501; G02B 6/32; G01J 1/0266
See application file for complete search history.

(56) References Cited

FOREIGN PATENT DOCUMENTS

| JP | 2018170647 A | * | 11/2018 | ............... G02B 6/32 |
| JP | 2018170847 A | | 11/2018 | |
| TW | 201838361 A | | 10/2018 | |

OTHER PUBLICATIONS

JP-2018170647A Machine translation (Year: 2018).*
International Search Report and Written Opinion (English translation only for ISR) dated May 25, 2021 for International Application No. PCT/JP201/007875.
Bekkali, Abdelmoula, et al., "Full-duplex FSO Communication System utilizing Optical Image Stabilizer and Free-Space Optical Circulator", 2020 European Conference on Optical Communications (ECOC), Dec. 6, 2020, pp. 1-3.
Kaymak, Yagiz, et al., "A Survey on Acquisition, Tracking, and Pointing Mechanisms for Mobile Free-Space Optical Communications", IEEE Communications Surveys & Tutorials, vol. 20, Issue: 2, Second quarter 2018, Feb. 9, 2018, pp. 1104-1123.
Futami, Fumio, et al., "Secure Free-Space Optical Transmission of Y-00 Quantum Stream Cipher with 4096-Level Intensity Modulated Signals", 2020 Conference on Lasers and Electro-Optics Pacific Rim (CLEO-PR), Aug. 2, 2020, pp. 1-2.
[English Translation] The First Office Action for Chinese Patent Application No. 202180005127 dated Aug. 25, 2023, pp. all.

* cited by examiner

SPATIAL OPTICAL TRANSMISSION APPARATUS

CROSS REFERENCE TO RELATED APPLICATION(S)

This application is a U.S. National Stage filing under 35 U.S.C. § 371 of PCT Application No. PCT/JP2021/007875, filed Mar. 2, 2021, which claims priority to Japanese Application No. 2020-106236, filed Jun. 19, 2020, which are incorporated herein by reference, in their entirety, for any purpose.

TECHNICAL FIELD

The present invention relates to a spatial optical transmission apparatus capable of automatically controlling optical axis adjustment for a wide range of optical axis deviation.

BACKGROUND ART

There is a technology of spatial optical transmission as one of means for non-contact communication between two points. This spatial optical transmission is optical data communication, and thus is a technology allowing high-speed and high-capacity transfer. In order to reliably perform communication between two distant points, it is necessary to use an optical signal having high directivity, and it is necessary to accurately perform optical axis alignment.

For example, Patent Literature 1 discloses a spatial optical transmission apparatus.

CITATION LIST

Patent Literature

Patent Literature 1: JP 2018-170647 A

SUMMARY OF INVENTION

Technical Problem

The spatial optical transmission apparatus described in Patent Literature 1 can automatically control optical axis adjustment for a wide range of optical axis deviation. The apparatus requires a transmission-side apparatus used for transmission and a reception-side apparatus used for reception, and there is no problem with unidirectional data transmission. However, in order to realize bidirectional data communication, it is necessary to prepare two optical axes for data communication. If two optical axes are prepared, it is difficult to adopt the movement of the roll for control at the time of optical axis alignment, and as a result, there is a problem that the difficulty of optical axis alignment increases.

The present invention has been made in view of the above problem, and it is an object of the present invention to provide a spatial optical transmission apparatus capable of transmission and reception on one optical axis in common between transmission and reception.

Solution to Problem

A spatial optical transmission apparatus according to the present invention is a spatial optical transmission apparatus that transmits an optical signal emitted from a transmission optical fiber cable to a counterpart side, receives an optical signal from the counterpart side and causes the optical signal to enter a reception optical fiber cable, and realizes communication by spatial optical transmission, the spatial optical transmission apparatus including: an optical circulator configured to output and project an optical signal emitted from the transmission optical fiber cable and input to a first port, from a second port to a counterpart side, and output an optical signal input from the counterpart side to the second port, from a third port; at least one or more light projecting movable lenses positionally adjustable in a plane substantially perpendicular to an optical axis of an optical signal passing through the second port outside the second port of the optical circulator; at least one or more light receiving movable lenses positionally adjustable in a plane substantially perpendicular to an optical axis of an optical signal passing through the third port outside the third port of the optical circulator; at least one or more spectroscopes configured to split an optical signal having passed through the light receiving movable lens to transmitted light and reflected light; at least one or more position sensors configured to detect a position of an optical axis using either one of the transmitted light or reflected light from the spectroscope; and a control unit configured to perform position adjustment of the light receiving movable lens and/or the light projecting movable lens on the basis of the optical axis position detected by the position sensor, and control optical axis adjustment so that the other of the transmitted light or reflected light from the spectroscope is appropriately incident on the reception optical fiber cable.

In the spatial optical transmission apparatus according to the present invention, the light projecting movable lens is controlled so that a drive amount of the light projecting movable lens is the same as a drive amount of the receiving movable lens closest to the optical circulator on an optical signal path through which an optical signal output from the third port is incident on the reception optical fiber cable, whereby the light projecting movable lens and the receiving movable lens are driven in conjunction with each other.

In the spatial optical transmission apparatus according to the present invention, a first receiving movable lens, a first spectroscope, a second receiving movable lens, and a second spectroscope are sequentially provided on an optical signal path through which an optical signal output from the third port is incident on the reception optical fiber cable, and light branched from the path by the first spectroscope is input to a first position sensor, and light branched from the path by the second spectroscope is input to a second position sensor, and the control unit performs first PID control to perform PID control on the first receiving movable lens based on the optical axis position detected by the first position sensor, and performs second PID control to perform PID control on the second receiving movable lens based on the optical axis position detected by the second position sensor.

In the spatial optical transmission apparatus according to the present invention, a single control amount of the movable lens with respect to a shift amount from a center of the optical axis position detected by the position sensor is set to be different between the first PID control and the second PID control.

The spatial optical transmission apparatus according to the present invention further includes: a laser light source configured to transmit beacon light to a counterpart side; a high-speed camera configured to detect beacon light transmitted from the counterpart side; and an electronic platform that is disposed in a lower portion of a housing and is positionally adjustable by moving the entire housing within a predetermined range, and the control unit calculates optical barycentric coordinates of the beacon light detected by the high-speed camera, and controls the electronic platform such that an imaging axis of the high-speed camera is positioned at a center of the optical barycentric coordinates.

A spatial optical transmission apparatus according to the present invention is a spatial optical transmission apparatus that transmits an optical signal emitted from a transmission optical fiber cable to a counterpart side, receives an optical signal from the counterpart side and causes the optical signal to enter a reception optical fiber cable, and realizes communication by spatial optical transmission, the spatial optical transmission apparatus including: an optical circulator configured to output and project an optical signal input to a first port and emitted from the transmission optical fiber cable, from a second port to a counterpart side, and output an optical signal input from the counterpart side to the second port, from a third port; at least one or more light projecting movable lenses positionally adjustable in a plane substantially perpendicular to an optical axis of an optical signal passing through the second port outside the second port of the optical circulator; at least one or more light receiving movable lenses positionally adjustable in a plane substantially perpendicular to an optical axis of an optical signal passing through the third port outside the third port of the optical circulator; at least one or more spectroscopes configured to split an optical signal having passed through the light receiving movable lens to transmitted light and reflected light; an optical power detector configured to measure optical reception intensity of communication light incident on the reception optical fiber cable; and a control unit configured to measure light reception intensity by the optical power detector at a current control position of the light receiving movable lens to be controlled and at one or more measurement positions of the light receiving movable lens driven by a predetermined control amount from the current control position, and control the light receiving movable lens to be located at the measurement position with the highest light reception intensity.

Advantageous Effects of Invention

According to the present invention, the optical circulator is adopted to make the light projecting optical axis and the light receiving optical axis uniaxial, so that it is possible to reduce the difficulty of optical axis alignment in the case of performing bidirectional spatial optical transmission. The control of the light projecting movable lens is performed in conjunction with the control of the receiving movable lens, so that it is possible to simultaneously realize the control of the light receiving axis and the control of the light projecting axis. The two lenses of the first receiving movable lens and the second receiving movable lens are provided in the light receiving optical axis path to perform the first PID control and the second PID control in two stages, thereby enhancing the accuracy of optical axis alignment. In addition, by controlling the electronic platform according to the optical barycentric position of the beacon light, the accuracy of optical axis alignment is further improved.

The shift of the optical axis from the center can be grasped by the beacon light in a situation where the optical axis may be shifted, such as communication with a mobile body, thereby, enhancing tracking capability for returning the optical axis to the original position even if a change occurs in the direction in which the optical axis is shifted.

In addition, according to the present invention, the light reception intensity in the reception optical fiber cable is measured by the optical power detector at the current control position of the light receiving movable lens to be controlled and at one or more measurement positions of the light receiving movable lens driven by the predetermined control amount from the current control position, and the light receiving movable lens is controlled so as to be located at the measurement position with the highest light reception intensity. Therefore, it is possible to perform control so as to maximize the actual light reception intensity.

DESCRIPTION OF EMBODIMENTS

First Embodiment

Figure 1:
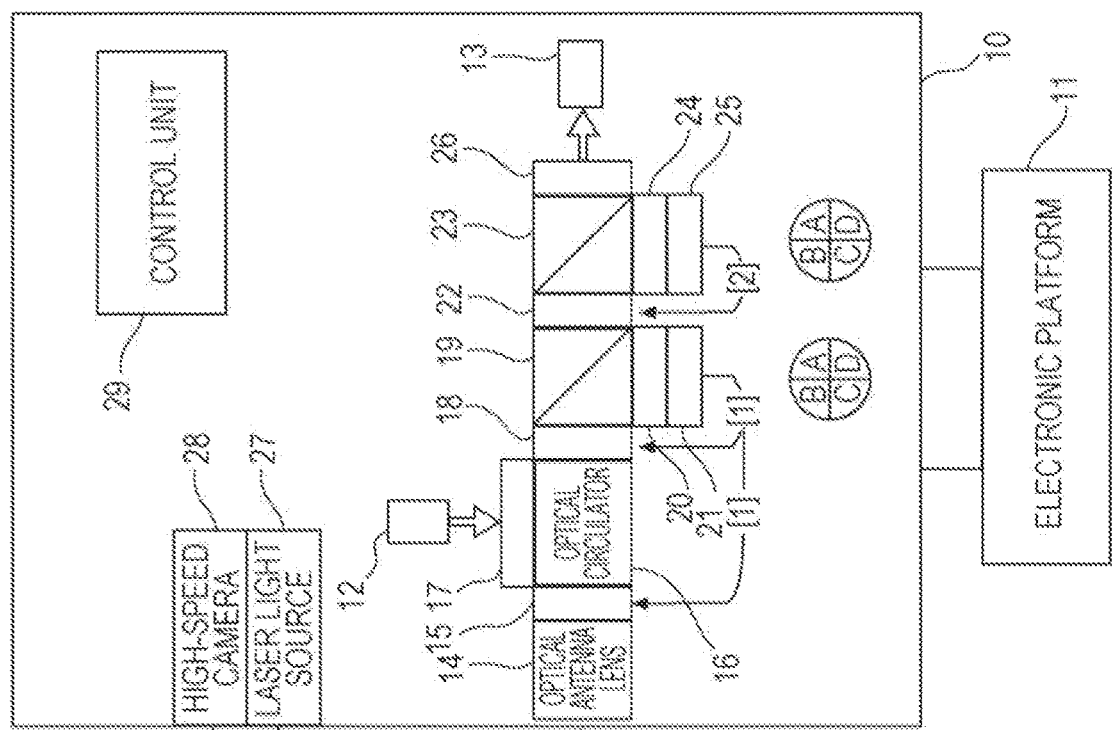
FIG. 1 is an explanatory diagram illustrating an example of a configuration of a spatial optical transmission apparatus 100 according to the present invention.
Figure 1:
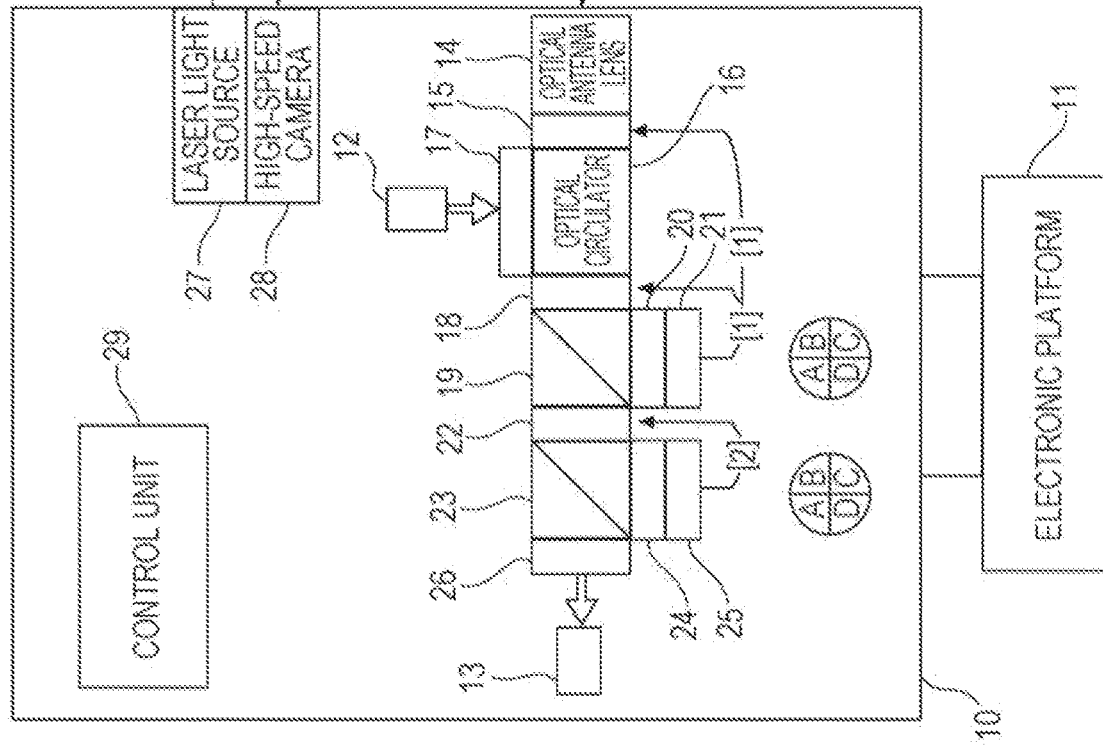

Hereinafter, an example of a spatial optical transmission apparatus will be described with reference to the drawings. FIG. 1 is an explanatory diagram illustrating an example of a configuration of a spatial optical transmission apparatus 100 according to the present invention. Referring to FIG. 1, description will be provided on the assumption that bidirectional spatial optical transmission communication is performed between a spatial optical transmission apparatus 100A and a spatial optical transmission apparatus 100B. The spatial optical transmission apparatus 100A and the spatial optical transmission apparatus 100B will be described as two apparatuses having the same performance as an example. Thus, functions with the same reference signs are the same functions unless otherwise described as distinguished from each other.

The spatial optical transmission apparatus 100 includes a housing 10 and an electronic platform 11 supporting the housing. Various configurations are stored inside the housing 10. A transmission optical fiber cable 12 is for propagating an optical signal for transmission. A reception optical fiber cable 13 is for propagating an optical signal for reception. An optical antenna lens 14 is configured to first receive light from a counterpart side. A light projecting movable lens 15 is a movable lens whose position is adjustable in a plane substantially perpendicular to the optical axis of an optical signal, and is used to adjust the light projecting axis. An optical circulator 16 is an optical device configured to output an optical signal emitted from the transmission optical fiber cable 12 input to a first port from a second port and project the optical signal to the counterpart side, and output an optical signal from the counterpart side input to the second port from a third port. A lens 17 is a lens for collecting an optical signal emitted from the transmission optical fiber cable 12. A first light receiving movable lens 13 is a movable lens whose position is adjustable in a plane substantially perpendicular to a light receiving optical axis of an optical signal, and is used to adjust the light receiving optical axis. A spectroscope 19 is configured to split the optical signal having passed through the first light receiving movable lens 18 into transmitted light and reflected light. For example, a beam splitter or the like is used as the spectroscope 19. A lens 20 is a lens for condensing the reflected light from the spectroscope 19. A first position sensor 21 is configured to detect the position of the optical axis using the reflected light from the spectroscope 19. For example, a quadrant photodetector (QPD) or the like is used as the first position sensor 21. A second light receiving movable lens 22 is a movable lens whose position is adjustable in a plane substantially perpendicular to the light receiving optical axis of an optical signal, and is used to adjust the light receiving optical axis. A spectroscope 23 is configured to split the optical signal having passed through the second light receiving movable lens 22 into transmitted light and reflected light. For example, a beam splitter or the like is used as the spectroscope 23. A lens 24 is a lens for condensing reflected light from the spectroscope 23. A second position sensor 25 is configured to detect the position of the optical axis using the reflected light from the spectroscope 23. For example, a quadrant photodetector (QPD) or the like is used as the second position sensor 25. A lens 26 is a lens for condensing an optical signal to be incident on the reception optical fiber cable 13. A laser light source 27 is configured to transmit beacon light. A high-speed camera 28 is configured to detect beacon light from the counterpart side. A control unit 29 is configured to execute various types of control necessary in the spatial optical transmission apparatus 100. Referring to FIG. 1, as an image of region setting with QPDs employed as the first position sensor 21 and the second position sensor 25, regions A to D are set in four corresponding regions of a circle. As illustrated in FIG. 1, in two spatial optical transmission apparatuses 100A and 100B which are communication partners, setting the four regions to be mirror images of each other produces an effect of stabilizing control that is performed based on the same control program.

Figure 2:
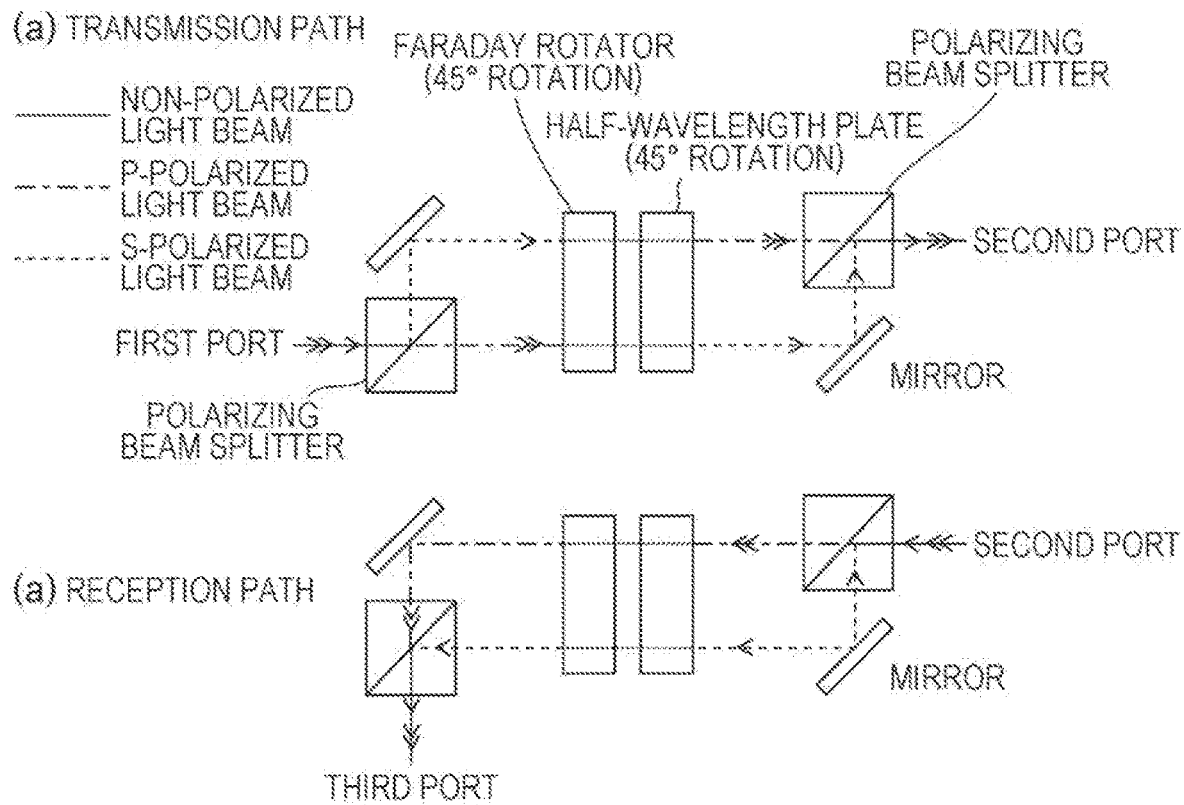
FIG. 2 is an explanatory diagram illustrating a mechanism of an optical circulator.

FIG. 2 is an explanatory diagram illustrating a mechanism of an optical circulator. As illustrated in FIG. 2(*a*), as a path at the time of transmission, transmission light of non-polarized light input to the first port is split by a polarizing beam splitter into two polarized light beams, P-polarized light beam and S-polarized light beam orthogonal to each other, and these beams are rotated by 45° each in the same direction, 90° in total, by a Faraday rotator and a ½ wavelength plate, such that the P-polarized light beam is converted into S-polarized light beam and the S-polarized light beam is converted into P-polarized light beam, then multiplexed by another polarizing beam splitter, and output from a second port. Further, as illustrated in 2(*b*), as a path at the time of reception, the transmission light of non-polarized light input to the first port is split into two polarized light beams, P-polarized light beam and S-polarized light beam orthogonal to each other by the polarization beam splitter, and these beams are rotated by 45° by the ½ wavelength plate and are rotated by 45° in the opposite direction by the Faraday rotator and returned to the original state due to the irreciprocity of the Faraday rotator, so that a change of the P-polarized light and the S-polarized light does not occur. Therefore, when multiplexed by the polarization beam splitter, the transmission light is output to a third port instead of the first port. By using the optical circulator of such a mechanism, the communication light of the transmission light and the reception light is uniaxial at the time of spatial optical transmission, but it is possible to selectively use the transmission port and the reception port inside the spatial optical transmission apparatus 100. The optical circulator does not need to be based on the principle illustrated in FIG. 2 as long as the optical circulator functions similarly.

Figure 3:
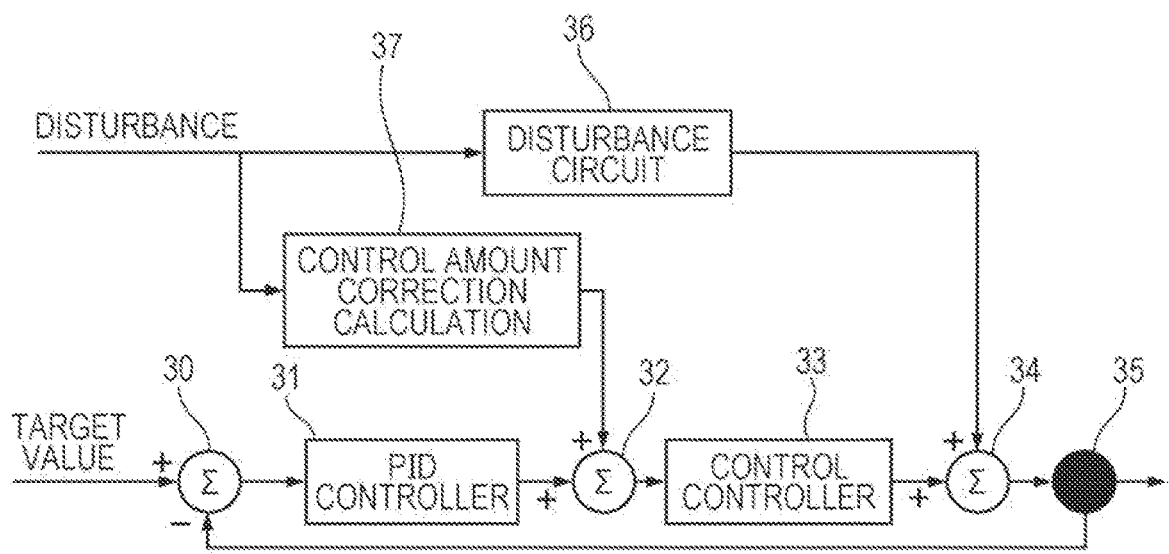
FIG. 3 is a block diagram illustrating an example of PID control.

FIG. 3 is a block diagram illustrating an example of PID control. The light projecting movable lens 15, the first light receiving movable lens 18, and the second light receiving movable lens 22 in the spatial optical transmission apparatus 100 are used to perform optical axis adjustment by their respective control methods. As one of these control methods, it is conceivable to perform Proportional-Integral-Differential Controller (PID) control. As illustrated in FIG. 2, first, a target value for the optical axis is input. Specifically, when it is assumed that the path of the reception light or the transmission light is optimal in a case where the position of the optical axis detected by the corresponding position sensor is the center, the coordinate position with the optical axis on the center of the position sensor is set as "0" as the target value.

Next, at a summing point 30, a difference between the information on the optical axis position detected by the immediately preceding position sensor (feedback from a pick-off point 35) and the target value is calculated and input to a PID controller 31. The PID controller 31 performs PID control based on three elements of the difference (deviation) from the target value, an integral thereof, and a derivative thereof, thereby to determine a control amount for the movable lens. On the basis of this control amount, the movable lens is driven by a control controller 33 to bring the optical axis position closer to the center. However, in actuality, since there is an influence of disturbance, the displacement amount of the optical axis due to the disturbance from a disturbance circuit 36 is added at a summing point 34 to the optical axis position after being driven by the control controller 33, and the actual optical axis position is determined.

As a problem of the feedback control, since the control is started after the optical axis position is shifted due to the influence of disturbance (displacement of the optical axis position detected by the position sensor), there is a point where a time delay occurs until the shift is corrected. Therefore, at the stage of detecting the influence of the disturbance, a control amount correction calculation unit 37 calculates the direction of the positional displacement and the moving distance with respect to the optical axis due to the influence of the disturbance, predicts the next position per unit time, calculates the correction value of the control amount in the direction of canceling the displacement, and adds the correction value from the control amount correction calculation unit 37 to the control amount from the PID controller 31 at the addition point 32 to determine the actual control amount. This makes it possible to immediately reflect the influence of the disturbance in the control amount although the correction value is a minute value.

The light projecting movable lens 15, the first light receiving movable lens 18, and the second light receiving movable lens 22 may be subjected to independent PID control. However, for example, the light projecting movable lens 15 may be controlled by the same drive amount as the drive amount of the first light receiving movable lens 18 such that the light projecting movable lens 15 and the first light receiving movable lens 18 are driven in conjunction with each other. In addition, first PID control related to the driving of the first light receiving movable lens 18 and second PID control related to the driving of the second light receiving movable lens 22 may be alternately executed.

Figure 4:
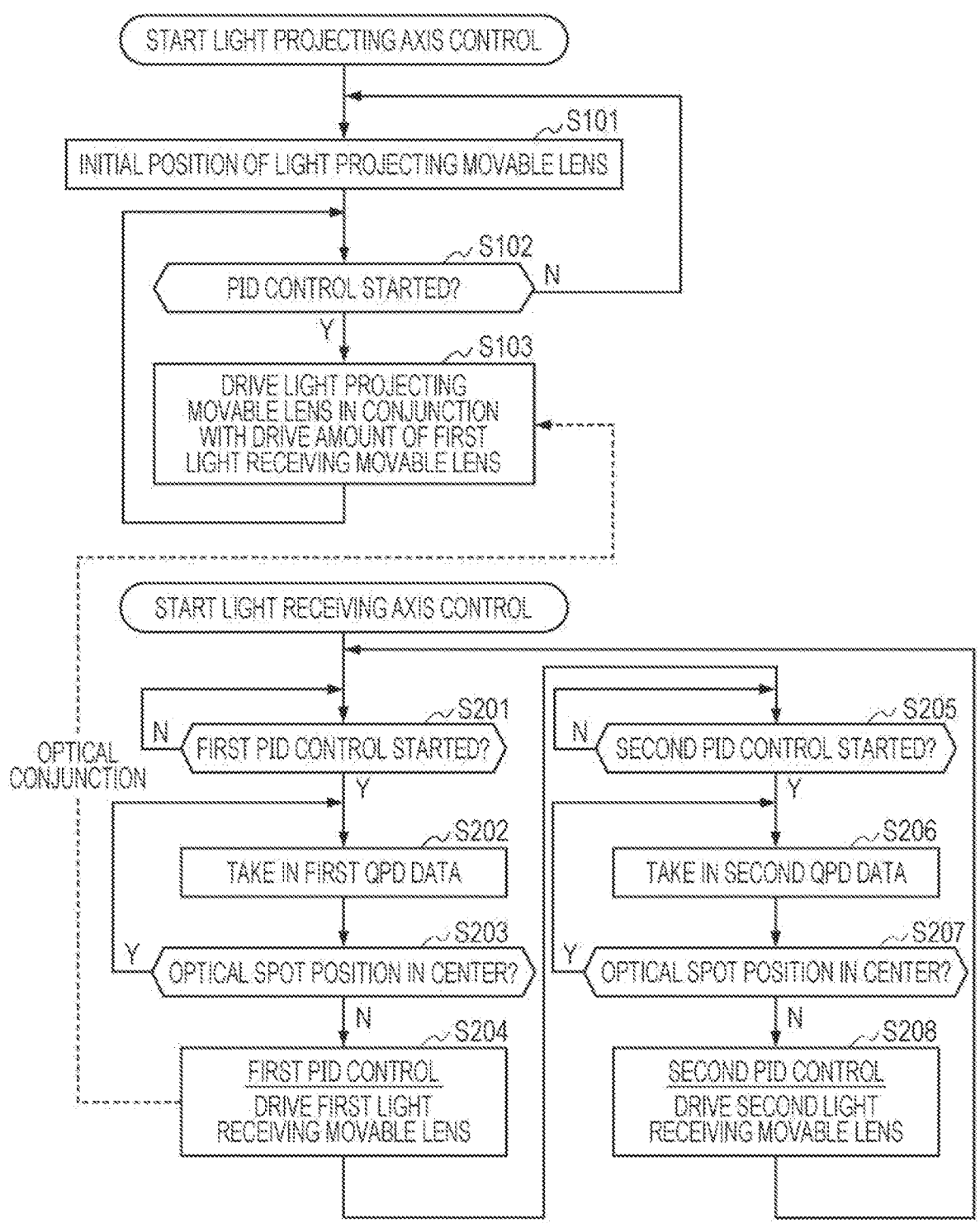
FIG. 4 is a flowchart illustrating an example of a process flow of two-stage PID control.

FIG. 4 is a flowchart illustrating an example of a process flow of two-stage PID control. First, a flowchart of light projecting axis control illustrated on the upper side of FIG. 4 will be described. The light projecting axis control is first started by the control unit 29 setting the light projecting movable lens to the initial position (step S101). Next, the control unit 29 determines whether PID control has been started (step S102). As long as the PID control is not started (S102—N), the control unit 29 maintains the light projecting movable lens at the initial position. When the PID control has been started (S102—Y), the control unit 29 drives the light projecting movable lens in conjunction with the drive amount of the first light receiving movable lens (step 3103).

Thereafter, as long as the PID control continues to be executed (3102—Y), the control unit 29 maintains the process of driving the light projecting movable lens in conjunction with the drive amount of the first light receiving movable lens (step S103).

A flowchart of light receiving axis control illustrated on the lower side of FIG. 4 will be described. In the light receiving axis control, first, the control unit 29 determines whether the first PID control has been started (step S201). When the first PID control has been started (S201—Y), the control unit 29 fetches optical axis position data acquired by the first position sensor (first QPD) (step 3202). Next, the control unit 29 determines whether the acquired optical axis position is located at the center of an optical spot position (step S203). When the acquired optical axis position is located at the center of the optical spot position (S203—Y), the control unit 29 returns to step S202 to acquire the optical axis position data by the first position sensor again without executing the drive control. When the acquired optical axis position is deviated from the center of the optical spot position (S203—N), the control unit 29 determines the drive amount of the first light receiving movable lens so that the optical axis position moves to the center as specific processing of the first PID control, and executes the drive control (step 3204). Next, the control unit 29 determines whether the second PID control has been started (step S205). When the second PID control has been started (3205-Y), the control unit 29 fetches optical axis position data acquired by the second position sensor (second QPD) (step S206). Next, the control unit 29 determines whether the acquired optical axis position is located at the center of an optical spot position (step S207). When the acquired optical axis position is located at the center of the optical spot position (S207—Y), the control unit 29 returns to step S206 to acquire the optical axis position data by the second position sensor again without executing the drive control. When the acquired optical axis position is out of the center of the optical spot position (S207—N), the control unit 29 determines the drive amount of the second light receiving movable lens so that the optical axis position moves to the center as specific processing of the second PID control, and executes the drive control (step 3208). When the drive control of the second light receiving movable lens has completed, the control unit 29 returns to step S201 and repeatedly executes the light receiving axis control from the beginning.

By alternately executing the first PID control and the second PID control as illustrated in FIG. 4 and driving the light projecting movable lens in conjunction with the drive amount of the first light receiving movable lens determined by the first PID control, it is possible to reliably converge the optical axis alignment. In addition, by setting the control width to be different between the first PID control and the second PID control, for example, setting the first PID control to perform rough control and setting the second PID control to perform fine control, it is possible to expect a reduction in time until convergence.

Figure 5:
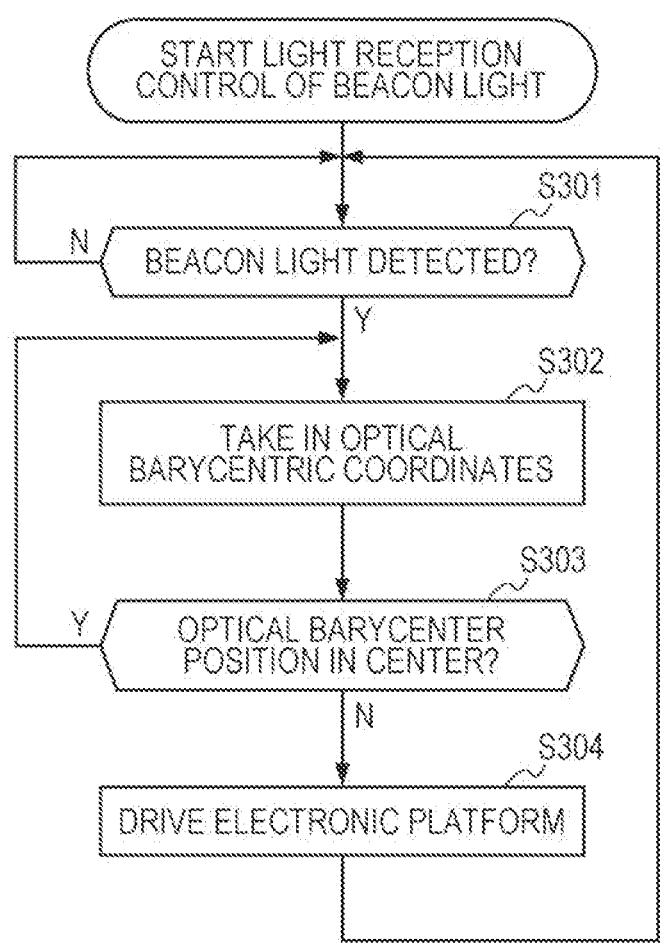
FIG. 5 is a flowchart illustrating an example of a process flow of electronic platform control using beacon light.

FIG. 5 is a flowchart illustrating an example of a process flow of electronic platform control using beacon light. The optical axis position can be detected by the first position sensor 21 and the second position sensor 25 in a case where the communication light from the counterpart side can be captured by the optical antenna lens 14. If the optical axis is shifted to such an extent that the communication light cannot be captured at all, another optical axis position adjustment unit is required. Therefore, as illustrated in FIG. 1, the spatial optical transmission apparatus 100 may be provided with the laser light source 27 and the high-speed camera 28 to realize more rough optical axis position adjustment by driving and controlling the electronic platform 11 on the basis of the shift amount from the center when the high-speed camera 28 receives beacon light generated mutually by the laser light source 27 and the counterpart side. As also illustrated in FIG. 1, it is necessary to set the optical axis such that, when the beacon light from the counterpart side is captured at the center of the high-speed camera 28, the beacon light transmitted by the own apparatus is captured at the center of the high-speed camera 28 at the counterpart side. Here, the communication light needs to be an optical signal having high directivity, but the beacon light used only for optical axis adjustment can be picked up at the counterpart side with higher probability by being emitted at a wide angle.

As illustrated in FIG. 5, the light reception control of the beacon light is started by the control unit 29 initiating detection of the beacon light (step S301). When the beacon light has been detected by the high-speed camera 28 (S301—Y), the control unit 29 takes in optical barycentric coordinates of the detected beacon light (specifies by calculation) (step S302). Specifically, by calculating the light intensity of the beacon light of each pixel in the captured image having been successfully captured by the high-speed camera 28, a pixel (or region) having the strongest light intensity in the captured image can be specified. When a pixel (or region) having the strongest light intensity in the captured image is considered as the optical barycentric coordinates of the beacon light, the optical barycentric coordinates can be estimated as a place where the beacon light has traveled straight, that is, a place where the center optical axis of the laser light source 27 has collided with the captured image plane. Next, the control unit 29 determines whether the optical barycentric coordinates of the beacon light are located at the center of the imaging range of the high-speed camera (step S303). If the optical barycentric coordinates of the beacon light are located at the center of the imaging range of the high-speed camera 28 (S303—Y), it is not necessary to adjust the optical axis. Therefore, the control unit 29 returns to step S302 and takes in the optical barycentric coordinates of the beacon light again without executing the drive control of the electronic platform 11. If the optical barycentric coordinates of the beacon light are out of the center of the imaging range of the high-speed camera 28 (S303—N), the control unit 29 determines the drive amount of the electronic platform 11 such that the optical barycentric coordinates of the beacon light move to the center, and executes the drive control (step S304). When the drive control of the electronic platform 11 has completed, the control unit 29 returns to step S301 and repeatedly executes the light reception control of the beacon light from the beginning.

As described above, by providing both wider optical axis alignment using beacon light and optical axis alignment to move the optical axis position detected by the position sensor to the center by PID control, it is possible to reliably perform optical axis alignment, and it is possible to easily align the optical axis again even in a situation where the aligned optical axis has been shifted due to an irregular change.

The control target may be switched according to the state such that the optical axis adjustment is performed by the electronic platform 11 when the shift amount of the optical barycentric coordinates of the beacon light from the imaging center is equal to or greater than a predetermined value, and the optical axis adjustment is performed by the movable lens without controlling the electronic platform 11 when the shift amount is within the predetermined value.

As described above, according to the spatial optical transmission apparatus 100 of the present invention, the optical circulator is adopted to make the light projecting optical axis and the light receiving optical axis uniaxial, so that it is possible to reduce the difficulty of optical axis alignment in the case of performing bidirectional spatial optical transmission. The control of the light projecting movable lens is performed in conjunction with the control of the receiving movable lens, so that it is possible to simultaneously realize the control of the light receiving axis and the control of the light projecting axis. The two lenses of the first receiving movable lens and the second receiving movable lens are provided in the light receiving optical axis path to perform the first PID control and the second PID control in two stages, thereby enhancing the accuracy of optical axis alignment. In addition, by controlling the electronic platform according to the optical barycentric position of the beacon light, the accuracy of optical axis alignment is further improved.

The shift of the optical axis from the center can be grasped by the beacon light in a situation where the optical axis may be shifted, such as communication with a mobile body, thereby, enhancing tracking capability for returning the optical axis to the original position even if a change occurs in the direction in which the optical axis is shifted.

The above embodiment, has been described on the assumption that the movable lens is structured to be positionally adjustable at least in a plane (X-Y plane) substantially perpendicular to the optical axis of the optical signal. Furthermore, the movable lens may be further positionally adjustable in the optical axis direction (Z-axis direction). By providing the movable lens with an adjustment function in the optical axis direction, it is possible to perform fine adjustment in the Z-axis direction of the movable lens while observing the reception intensity in the reception optical fiber cable 13, and set the movable lens to a position where the maximum reception intensity can be obtained.

Second Embodiment

Figure 6:
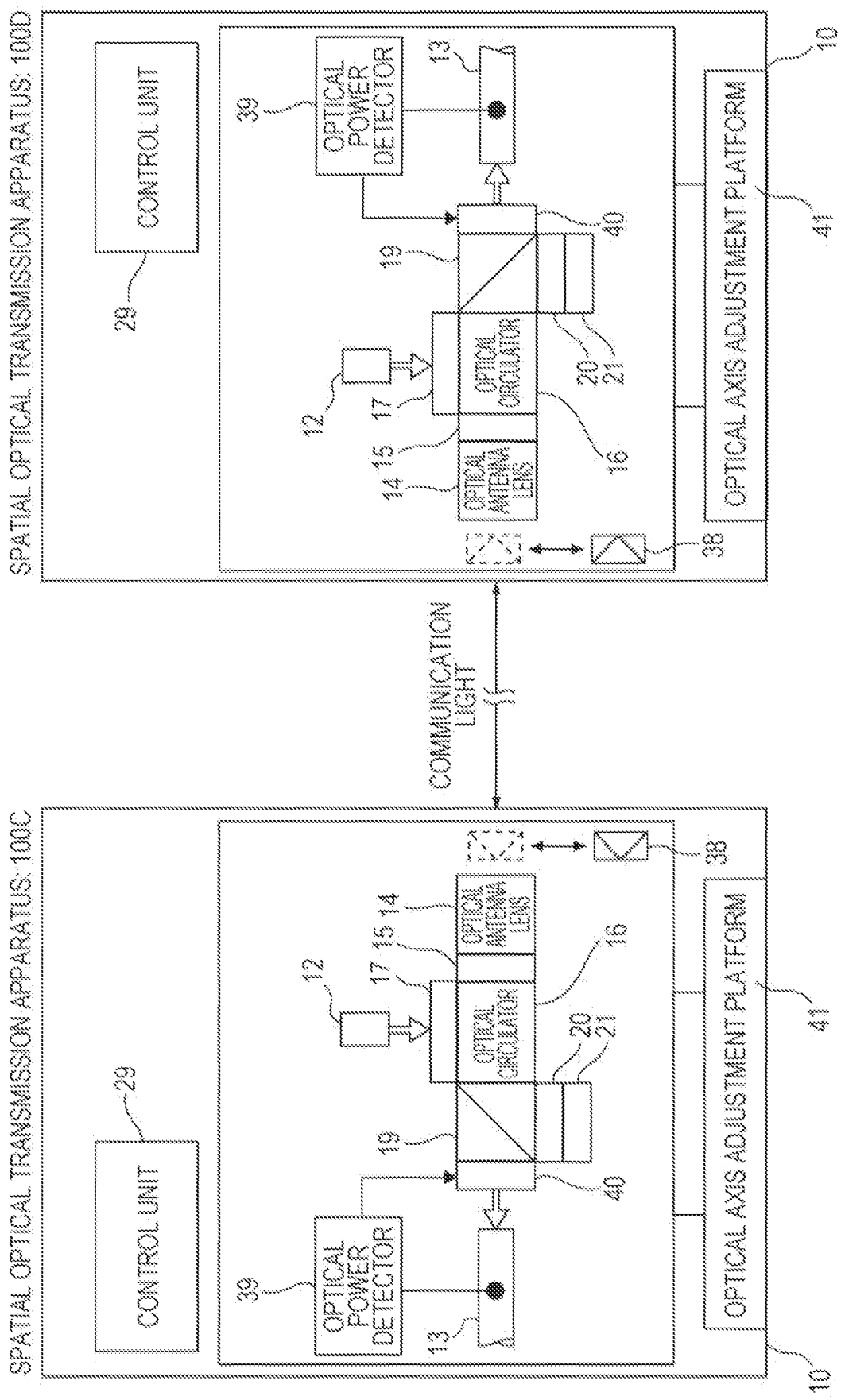
FIG. 6 is an explanatory diagram illustrating an example of a configuration of a spatial optical transmission apparatus 100 according to the present invention.

FIG. 6 is an explanatory diagram illustrating an example of a configuration of a spatial optical transmission apparatus 100 according to the present invention. The example illustrated in FIG. 6 is a configuration for performing bidirectional spatial optical transmission on the same optical axis between spatial optical transmission apparatuses 100C and 100D having the same configuration. The spatial optical transmission apparatuses 100C and 100D described below measure the optical reception intensity of an optical signal received by an optical power detector and control a light receiving movable lens on the basis of the measurement result to adjust a light reception optical axis. The detailed configuration of the optical apparatuses is not limited to the example illustrated in FIG. 6.

In the spatial optical transmission apparatuses 100C and 100D, various configurations are stored inside the housing 10. A transmission optical fiber cable 12 is for propagating an optical signal for transmission. A reception optical fiber cable 13 is for propagating an optical signal for reception. An optical antenna lens 14 is configured to first receive light from a counterpart side. A light projecting movable lens 15 is a movable lens whose position is adjustable in a plane substantially perpendicular to the optical axis of an optical signal, and is used to adjust the light projecting axis. An optical circulator 16 is an optical device configured to output an optical signal emitted from the transmission optical fiber cable 12 input to a first port from a second port and project the optical signal to the counterpart side, and output an optical signal from the counterpart side input to the second port from a third port. A lens 17 is a lens for collecting an optical signal emitted from the transmission optical fiber cable 12. The lens 17 may also be a movable lens. A spectroscope 19 is configured to split the optical signal output from the third port of the optical circulator 16 into transmitted light and reflected light. For example, a beam splitter or the like is used as the spectroscope 19. A lens 20 is a lens for condensing the reflected light from the spectroscope 19. A first position sensor 21 is configured to detect the position of the optical axis using the reflected light from the spectroscope 19. For example, a quadrant photodetector (QPD) or the like is used as the first position sensor 21. A control unit 29 is configured to execute various types of control necessary in the spatial optical transmission apparatus 100. A retroreflector 38 is configured to reflect incident light in a direction parallel to and opposite to an incident direction. The retroreflector 38 is provided in front of the optical antenna lens 14 so that insertion and extraction can be arbitrarily performed. An optical power detector 39 is configured to measure the optical reception intensity of an optical signal incident on the reception optical fiber cable 13. A light receiving movable lens 40 is a movable lens whose position is adjustable in a plane substantially perpendicular to the light receiving optical axis of an optical signal, and is used to adjust the light receiving optical axis. An optical axis adjustment platform 41 is configured to change the posture of the entire optical apparatus system for optical axis adjustment in housing 10.

Optical axis adjustment in the spatial optical transmission apparatuses 100C and 100D illustrated in FIG. 6 will be described. First, at the places where the spatial optical transmission apparatus 100C and the spatial optical transmission apparatus 100D are installed, the installation positions of the entire housings 10 are adjusted so that an optical signal is emitted to a position where the optical antenna lens 14 on the counterpart side is located. Next, the retroreflector 3S of the spatial optical transmission apparatus 100D on the counter side is inserted in front of the optical antenna lens 14. Then, an optical signal is output from the transmission optical fiber cable 12 of the spatial optical transmission apparatus 100C on the side where the optical axis adjustment is to be performed, and is emitted to the spatial optical transmission apparatus 100D on the counterpart side. When the emitted optical signal is incident on the light receiving range of the retroreflector 38 on the counterpart side, the optical signal is reflected and returned from the retroreflector 38 and returned. However, when the emitted optical signal is not incident on the light receiving range of the retroreflector 38 on the counterpart side, the optical signal never returns. When the optical signal is reflected and returned, the optical signal can be received by the first position sensor 21 via the optical antenna lens 14 to the spectroscope 19. That is, the installation position of the entire housing 10 is adjusted by searching for the position where the optical signal is to be received by the first position sensor 21. In addition, the emission direction of the optical signal may be adjusted by the optical axis adjustment platform 41 provided inside the housing so as to receive the reflected light from the retroreflector 33 on the counterpart side.

Then, when the optical axis adjustment related to the emission of the optical signal from one side has completed, the optical axis adjustment related to the emission of an optical signal from the other side is similarly executed. When the optical axis adjustment on both of the sides has completed in this manner, the axes are substantially overlapped, but further fine adjustment is required. As fine adjustment of the optical axis as the initial setting, the optical axis adjustment is also executed for the light projecting movable lens 15, the lens 17 in the case of adopting the movable lens, and the like. In the optical axis adjustment as the initial setting, the adjustment may be performed using the light reception intensity detected by the optical power detector 39 as a guide.

After the optical axis adjustment using the retroreflectors 38, actual bidirectional communication becomes possible. During the actual bidirectional communication, as described in the first embodiment, the position of the light projecting movable lens 15 is controlled by performing PID control so that the light receiving position of the optical signal approaches the center based on the reception position of the optical signal detected by the first position sensor 21.

Furthermore, the spatial optical transmission apparatuses 100C and 100D according to the second embodiment are each characterized in that the position adjustment of the light receiving movable lens 40 is controlled on the basis of the measurement result of the light reception intensity by the optical power detector 39.

Figure 7:
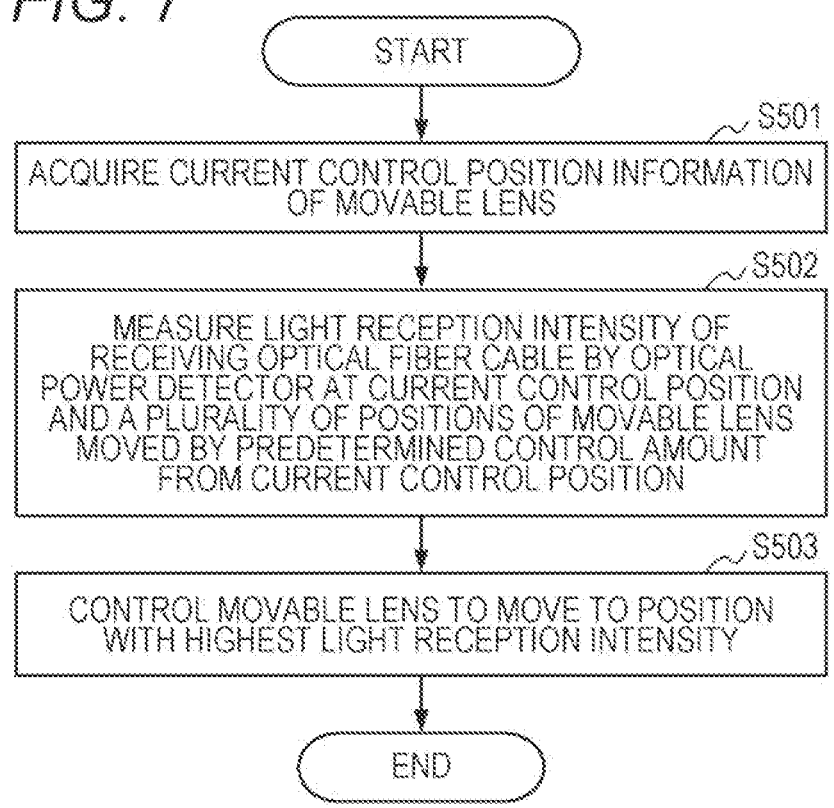
FIG. 7 is a flowchart illustrating an example of a process flow of operating lens position control based on light reception intensity.

FIG. 7 is a flowchart illustrating an example of a flow of position control processing of the light receiving movable lens 40 based on light reception intensity. As illustrated in FIG. 7, the position control process is started by the control unit 29 acquiring the current control position information of the light receiving movable lens 40 (step S501). Next, the control unit 29 measures the optical reception intensity of the reception optical fiber cable 13 by the optical power detector 39 at the current control position and a plurality of positions obtained by moving the movable lens by a predetermined control amount from the current control position (step S502). Then, the control unit 29 performs control to move the light receiving movable lens 40 to a position where the light reception intensity is the highest (step 3503), and ends the processing. It is conceivable that the position control process illustrated in FIG. 7 is executed, for example, at regular time intervals or in a case where the light reception intensity of the reception optical fiber cable 13 detected by the optical power detector 39 changes by a predetermined value or more.

Figure 8:
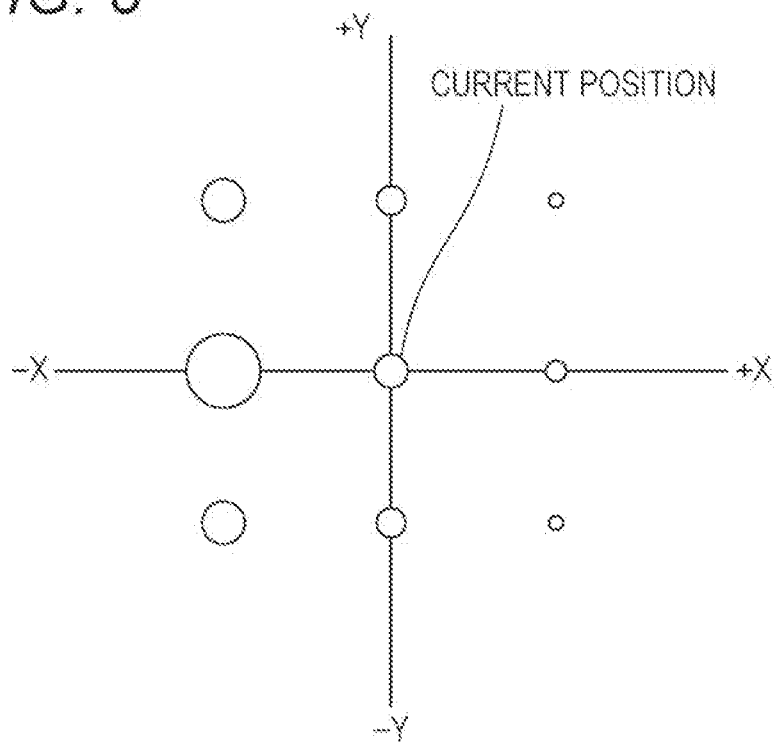
FIG. 8 is an explanatory diagram illustrating an example of a measurement position of light reception intensity.

FIG. 8 is an explanatory diagram illustrating an example of a measurement position of light reception intensity. In FIG. 8, the magnitude of the light reception intensity is expressed by the size of a circle, and the light reception intensity at the current position of the light receiving movable lens 40 is mainly displayed. The plurality of positions where to measure the light reception intensity may be set in any manner. In the example of FIG. 8, total nine points of combinations including any of three patterns of movement of each of the X axis and the Y axis in a + direction from the center position by a predetermined drive amount, no movement, and movement in a − direction by a predetermined drive amount (including the current position of the light receiving movable lens 40) are set at the measurement positions of light reception strength in an X-Y plane where the drive control of the light receiving movable lens 40 is performed. As a result of measuring the optical reception intensity at the nine points, the example illustrated in FIG. 8 indicates that the light reception intensity was the highest at a position moved by a predetermined drive amount in the negative direction only with regard to the X axis. That is, in a case where the measurement results of the light reception intensity as illustrated in FIG. 8 are obtained, control of moving the light receiving movable lens 40 by a predetermined driving amount in the negative direction is executed. Such control makes it possible to control the light receiving movable lens 40 so that the light reception intensity of the reception optical fiber cable 13 becomes higher.

As described above, according to the spatial optical transmission apparatus of the second embodiment of the present invention, the light reception intensity is measured by the optical power detector at the current control position of the light receiving movable lens to be controlled and at one or more measurement positions of the light receiving movable lens driven by the predetermined control amount from the current control position, and the light receiving movable lens is controlled so as to be located at the measurement position with the highest light reception intensity. Therefore, it is possible to perform control so as to maximize the actual light reception intensity.

The drive control of the light receiving movable lens 40 by the optical power detector 39 in the second embodiment has been described assuming that the control is adjusted in the X-Y plane (plane perpendicular to the communication optical axis), but the present invention is not limited thereto. Control may be performed so as to be adjusted also in the Z direction (communication optical axis direction). In this case, the control in the X-Y plane and the control in the Z axis may be separately executed, or the control in the X-Y plane and the control in the Z axis may be simultaneously executed, that is, the light reception intensities at a plurality of measurement positions in the XYZ space may be compared.

In addition, in relation to the second embodiment, the object to be controlled by the measurement of the light reception intensity by the optical power detector 39 has been described as the light receiving movable lens 40, but the present invention is not limited thereto. For example, at the stage of the optical axis adjustment as the initial setting, the control may be performed such that the positions of the projecting movable lens 15, the lens 17 in the case of adopting the movable lens, the optical axis adjustment platform 41, and the like are adjusted to positions with higher optical reception intensities based on the measurement of the optical reception intensity by the optical power detector 39.

REFERENCE SIGNS LIST 100, 100A, 100B Spatial optical transmission apparatus
10 Housing
11 Electronic platform
12 Transmission optical fiber cable 13 Reception optical fiber cable
14 Optical antenna lens
15 Light projecting movable lens
16 Optical circulator
17 Lens
18 First light receiving movable lens
19 Spectroscope (beam splitter)
20 Lens
21 First position sensor (first QPD)
22 Second light receiving movable lens
23 Spectroscope (beam splitter)
24 Lens
Second position sensor (second QPD)
26 Lens
27 Laser light source
28 High-speed camera
29 Control unit
38 Retroreflector
39 Optical power detector
40 Light receiving movable lens
41 Optical axis adjustment platform

The invention claimed is:

1. A spatial optical transmission apparatus comprising:
an optical circulator configured to receive a first optical signal from a transmission optical fiber cable at a first port, and to provide the first optical signal at a second port to a counterpart apparatus, and further configured to receive a second optical signal from the counterpart apparatus at the second port, and to provide the second optical signal at a third port;
at least one movable light projecting lens positionally adjustable in a plane substantially perpendicular to an optical axis of an optical signal through the second port outside the second port of the optical circulator;
at least one movable light receiving lens positionally adjustable in a plane substantially perpendicular to an optical axis of an optical signal through the third port outside the third port of the optical circulator;
at least one spectroscope configured to split an optical signal through the at least one movable light receiving lens into transmitted light and reflected light;
at least one position sensor configured to detect a position of an optical axis of either one of the transmitted light or reflected light from the spectroscope; and
a controller configured to adjust at least one of a position of the movable light receiving lens or the movable light projecting lens based on the position of the optical axis, and further configured to adjust the optical axis to cause the other of the transmitted light or reflected light from the spectroscope to enter a reception optical fiber cable.

2. The spatial optical transmission apparatus according to claim 1, wherein
the controller is configured to drive the movable light projecting lens in conjunction with the movable light receiving lens to cause a drive amount of the movable light projecting lens to be the same as a drive amount of the movable light receiving lens closest to the optical circulator on an optical signal path of an optical signal from the third port that enters the reception optical fiber cable.

3. The spatial optical transmission apparatus according to claim 1, comprising:
a first movable light receiving lens on an optical signal path of an optical signal from the third port that enters the reception optical fiber cable;
a first spectroscope on the optical signal path, configured to provide first light based on the optical signal;
a second movable light receiving lens on the optical signal path;
a second spectroscope on the optical signal path, configured to provide second light based on the optical signal;
a first position sensor configured to receive the first light and further configured to detect a first position of an optical axis of the optical signal; and
a second position sensor configured to receive the second light and further configured to detect a second position of the optical axis of the optical signal,
wherein the first spectroscope is disposed between the first and second movable light receiving lenses and the second movable light receiving lens is between the first and second spectroscopes, and
wherein the controller is configured to perform first Proportional-Integral-Differential (PID) control on the first movable light receiving lens based on the first position of the optical axis detected by the first position sensor, and further configured to perform second PID control on the second movable light receiving lens based on the second position of the optical axis detected by the second position sensor.

4. The spatial optical transmission apparatus according to claim 3, wherein
a first control amount of the first movable light receiving lens with respect to a shift amount from a center of the first position of the optical axis detected by the first position sensor and a second control amount of the second movable light receiving lens with respect to the shift amount from a center of the second position of the optical axis position detected by the second position sensor are set to be different between the first PID control and the second PID control.

5. The spatial optical transmission apparatus according to claim 1, further comprising:
a housing;
a laser light source in the housing configured to transmit beacon light to the counterpart apparatus;
a high-speed camera in the housing configured to detect beacon light transmitted from the counterpart apparatus; and
an electronic platform under the housing and configured to move the entire housing within a predetermined range, wherein
the controller is configured to calculate optical barycentric coordinates of the beacon light detected by the high-speed camera, and further configured to control the electronic platform to position an imaging axis of the high-speed camera at a center of the optical barycentric coordinates.

6. A spatial optical transmission apparatus comprising:
an optical circulator configured to receive a first optical signal from a transmission optical fiber cable at a first port, and to provide the first optical signal at a second port to a counterpart apparatus, and further configured to receive a second optical signal from the counterpart apparatus at the second port, and to provide the second optical signal at a third port;
at least one movable light projecting lens positionally adjustable in a plane substantially perpendicular to an optical axis of an optical signal through the second port outside the second port of the optical circulator;
at least one movable light receiving lens positionally adjustable in a plane substantially perpendicular to an optical axis of an optical signal through the third port outside the third port of the optical circulator;

at least one spectroscopes configured to split an optical signal through the light receiving movable lens to transmitted light and reflected light;

an optical power detector configured to measure optical reception intensity of communication light incident on the reception optical fiber cable; and a controller configured to measure light reception intensity by the optical power detector at a current control position of the movable light receiving lens and at one or more measurement positions of the movable light receiving lens apart from a predetermined distance from the current control position, and further configured to move the movable light receiving lens to the measurement position where the measured light reception intensity is the highest.

* * * * *